US012083694B2

(12) United States Patent
Noh et al.

(10) Patent No.: US 12,083,694 B2
(45) Date of Patent: *Sep. 10, 2024

(54) RAZOR BLADE WITH BENT PORTION

(71) Applicant: DORCO CO., LTD., Seoul (KR)

(72) Inventors: Ho Jun Noh, Seoul (KR); Jun Soo Chang, Seoul (KR)

(73) Assignee: Dorco Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/591,097

(22) Filed: Feb. 2, 2022

(65) Prior Publication Data

US 2022/0152855 A1 May 19, 2022

Related U.S. Application Data

(63) Continuation of application No. 16/460,620, filed on Jul. 2, 2019, now Pat. No. 11,267,149, which is a (Continued)

(30) Foreign Application Priority Data

Aug. 25, 2014 (KR) ........................ 10-2014-0110829

(51) Int. Cl.

*B26B 21/56* (2006.01)
*B26B 21/22* (2006.01)
*B26B 21/40* (2006.01)

(52) U.S. Cl.

CPC ............ *B26B 21/56* (2013.01); *B26B 21/222* (2013.01); *B26B 21/4012* (2013.01); *B26B 21/4031* (2013.01); *B26B 21/565* (2013.01)

(58) Field of Classification Search

CPC ..... B26B 21/56; B26B 21/565; B26B 21/222; B26B 21/4012; B26B 21/4031
See application file for complete search history.

(56) References Cited

U.S. PATENT DOCUMENTS 2,108,267 A 2/1938 Bernard
4,498,235 A 2/1985 Jacobson
(Continued)

FOREIGN PATENT DOCUMENTS

CN 102232010 A 11/2011
EP 2 823 942 A1 1/2015
(Continued)

OTHER PUBLICATIONS

Notice of Reason for Rejection issued by the Japan Patent Office for corresponding Japanese Patent Application No. 2016-546715, mailed on Oct. 25, 2016, with a Google English translation.
(Continued)

*Primary Examiner* — Ghassem Alie
*Assistant Examiner* — Samuel A Davies
(74) *Attorney, Agent, or Firm* — Knobbe, Martens, Olson & Bear, LLP

(57) ABSTRACT

An integral razor blade which is thin and has improved strength by shaping a geometrical structure of the razor blade and a razor cartridge using the same. The razor blade includes a base portion, a bent portion extending in a bent manner from one end of the base portion, and an edge portion extending from one end of the bent portion, a cutting edge being formed at one end of the edge portion. A first separation distance X between a straight line extending in a longitudinal direction from a front surface of the base portion and an end point of the cutting edge ranges from 0.3 mm to 1.0 mm.

14 Claims, 8 Drawing Sheets

Related U.S. Application Data continuation of application No. 15/052,251, filed on Feb. 24, 2016, now Pat. No. 10,369,714, which is a continuation of application No. PCT/KR2014/007896, filed on Aug. 25, 2014.

(56) References Cited

U.S. PATENT DOCUMENTS

| | | | |
|---|---|---|---|
| 5,010,646 | A | 4/1991 | Neamtu |
| 5,687,485 | A | 11/1997 | Shurtleff et al. |
| 5,761,814 | A | 6/1998 | Anderson et al. |
| 5,956,848 | A | 9/1999 | Tseng et al. |
| 5,956,851 | A | 9/1999 | Apprille et al. |
| 6,041,926 | A | 3/2000 | Petricca et al. |
| 6,052,903 | A | 4/2000 | Metcalf et al. |
| 6,185,822 | B1 | 2/2001 | Tseng et al. |
| 6,212,777 | B1 | 4/2001 | Gilder et al. |
| 6,442,839 | B1 | 9/2002 | Tseng et al. |
| 6,516,518 | B1 | 2/2003 | Garraway et al. |
| 6,612,040 | B2 | 9/2003 | Gilder |
| 6,684,513 | B1 | 2/2004 | Clipstone et al. |
| 7,100,284 | B2 | 9/2006 | King |
| 7,669,335 | B2 | 3/2010 | Walker et al. |
| 8,011,104 | B2 | 9/2011 | Masek et al. |
| 2011/0232100 | A1 | 9/2011 | Park et al. |
| 2011/0283550 | A1 | 11/2011 | Masek et al. |
| 2012/0132036 | A1 | 5/2012 | Bykowski et al. |
| 2013/0185942 | A1 | 7/2013 | Van Eibergen Santhagens |
| 2013/0205595 | A1 | 8/2013 | Bykowski et al. |
| 2014/0000114 | A1 | 1/2014 | Wester et al. |
| 2014/0026424 | A1 | 1/2014 | Oglesby et al. |
| 2014/0230252 | A1 | 8/2014 | Davos et al. |
| 2015/0013169 | A1 | 1/2015 | Warrick |
| 2015/0026986 | A1 | 1/2015 | Berglund |
| 2016/0167242 | A1 | 6/2016 | Noh et al. |
| 2017/0136639 | A1 | 5/2017 | Park et al. |
| 2019/0321995 | A1 | 10/2019 | Noh et al. |
| 2022/0168912 | A1 * | 6/2022 | Abramsky .......... B26B 21/4006 |

FOREIGN PATENT DOCUMENTS

| | | | |
|---|---|---|---|
| JP | 2007-518436 | A | 7/2007 |
| JP | 2007-527775 | A | 10/2007 |
| JP | 2009-533129 | A | 9/2009 |
| KR | 10-2006-0023995 | A | 3/2006 |
| KR | 10-2014-0079458 | A | 6/2014 |
| WO | 2012/158141 | A1 | 11/2012 |
| WO | 2013/050606 | A1 | 4/2013 |

OTHER PUBLICATIONS

International Search Report issued for corresponding International Patent Application No. PCT/KR2014/007896, mailed Aug. 25, 2014.

Office Action issued by the State Intellectual Property Office of China for corresponding Chinese Patent Application No. 201480053685.4, dated Mar. 29, 2017.

Office Action issued by the Japan Patent Office for corresponding Japanese Patent Application No. 2016-546715, mailed on Apr. 4, 2017.

Extended European search report with supplementary European search report and the European search opinion issued by the European Patent Office for corresponding European Patent Application No. 14900935.0, mailed on Mar. 9, 2018.

United States Patent and Trademark Office U.S. Appl. No. 15/052,251, Office Action dated Sep. 24, 2018, 28 pages.

United States Patent and Trademark Office U.S. Appl. No. 16/460,620, Office Action dated Sep. 3, 2020, 14 pages.

United States Patent and Trademark Office U.S. Appl. No. 16/460,620, Office Action dated Jul. 7, 2021, 9 pages.

* cited by examiner

-PRIOR ART-

RAZOR BLADE WITH BENT PORTION

This application is a continuation of U.S. patent application Ser. No. 16/460,620, filed Jul. 2, 2019, which is a continuation of U.S. patent application Ser. No. 15/052,251, filed Feb. 24, 2016, now U.S. Pat. No. 10,369,714, which is a continuation of international application No. PCT/KR2014/007896, filed on Aug. 25, 2014, which claims priority from Korean Patent Application No. 10-2014-0110829, filed on Aug. 25, 2014, the contents of which are all incorporated by reference herein in their entirety.

BACKGROUND

1. Technical Field

The present invention relates to a razor blade and a razor cartridge using the same, and more particularly, to an unitary razor blade which is thin and has improved strength by shaping a geometrical structure of the razor blade and a razor cartridge using the same.

2. Description of the Related Art

In a wet razor, it is important to prevent injury and damage while providing softness and neatness with high adhesion. As factors that affect the shaving performance of the wet razor, there are friction resistance between the skin and a cutting edge of a razor blade, sharpness of the cutting edge, and the like. These factors are generally associated with a cutting force applied to the hair by the razor blade.

Increasing the number of blades in the razor generally improves the shaving efficiency of the razor and makes better the pressing force distribution on the skin, but increases a drag force. Further, when the number of razor blades is increased, the area occupied by the razor blades increases or a distance between the cutting edges of the razor blades becomes narrow.

However, increasing the area occupied by the razor blades may have a bad influence on the shaving performance due to an increase in drag force. Further, if a distance between the razor blades is small, smooth shaving can be achieved, but shaving residues are sandwiched between the razor blades, which may cause a reduction in rinsability. On the contrary, if the distance between the razor blades is large, the rinsability can be improved, but it is highly likely to cause injury and damage to the skin. Accordingly, it is important to appropriately adjust the number of razor blades and the distance between razor blades.

A conventional razor blade is configured such that a blade having a cutting edge is mounted on a support having high strength. However, in conventional technology, the thickness of the support is increased to improve the strength of the support. Thus, the number of blades that can be mounted on the razor is limited, and it is difficult to reduce the distance between the blades. Even if the distance between the blades is reduced, the rinsability may be deteriorated.

In addition, in the conventional razor blade, after manufacturing the blade and the support separately, a welding process is required to couple the blade with the support. Thus, it may lead to an increase in production cost of the razor blade as well as a decrease in production efficiency due to an additional process.

Accordingly, it is essential to maintain the shaving performance while narrowing the distance between the razor blades, and it is necessary to reduce the thickness of the razor blade in order to facilitate the removal of shaving residues. However, if the razor blade is excessively thin, the hair on the skin may not be cut properly, and it may easily cause deformation and result in a reduction in durability. Therefore, a recent trend is to provide a razor blade having excellent strength while its thickness is thin.

SUMMARY

In view of the above, the present invention provides a razor blade which is thin and has improved strength by shaping a geometrical structure of the razor blade and a razor cartridge using the same.

The present invention also provides a razor blade formed in one-piece to improve production efficiency.

However, objects of the present invention are not limited to those set forth herein. The above and other objects of the present invention will become more apparent to one of ordinary skill in the art to which the present invention pertains by referencing the detailed description of the present invention given below.

In accordance with an aspect of the present invention, there is provided a razor blade comprising a base portion; a bent portion extending in a bent manner from one end of the base portion; and an edge portion extending from one end of the bent portion, a cutting edge being formed at one end of the edge portion, wherein a first separation distance X between a straight line extending in a longitudinal direction from a front surface of the base portion and an end point of the cutting edge ranges from 0.3 mm to 1.0 mm.

In accordance with another aspect of the present invention, there is provided a razor cartridge comprising a housing forming an internal space; and a plurality of razor blades installed in the internal space of the housing, each razor blade including a base portion, a bent portion extending in a bent manner from one end of the base portion, and an edge portion extending from one end of the bent portion, a cutting edge being formed at one end of the edge portion, wherein a first separation distance X between a straight line extending in a longitudinal direction from a front surface of the base portion and an end point of the cutting edge ranges from 0.3 mm to 1.0 mm.

The details of one or more embodiments of the invention are set forth in the accompanying drawings and the description below.

Embodiments of the present invention, razor blades and razor cartridges using the same, provide at least the following effects.

It is possible to provide a razor blade which is thin and has improved strength by shaping a geometrical structure of the razor blade. Also, it is possible to improve production efficiency by providing a razor blade formed in one-piece.

The effects of the present invention are not limited to the above-described effects and other effects which are not described herein will become apparent to those skilled in the art from the following description.

DETAILED DESCRIPTION OF EXAMPLE EMBODIMENTS

Figure 1:
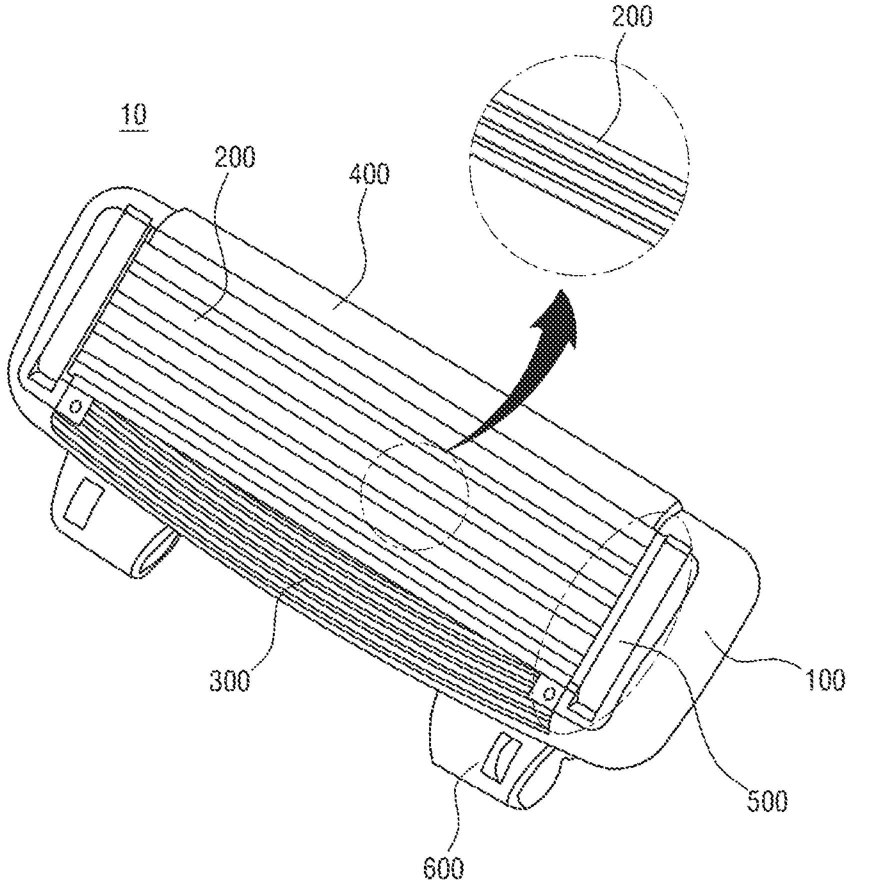
FIG. 1 is a perspective view of a razor cartridge on which razor blades are mounted according to an embodiment of the present invention.

The present invention relates to an unitary razor blade which is thin and has improved strength by shaping a geometrical structure of the razor blade and a razor cartridge using the same. The razor blade includes a base portion; a bent portion extending in a bent manner from one end of the base portion; and an edge portion extending from one end of the bent portion, a cutting edge being formed at one end of the edge portion, wherein a first separation distance X between a straight line extending in a longitudinal direction from a front surface of the base portion and an end point of the cutting edge ranges from 0.3 mm to 1.0 mm.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Throughout the specification, like reference numerals in the drawings denote like elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a razor blade according to embodiments of the present invention will be described with reference to the drawings.

Figure 2:
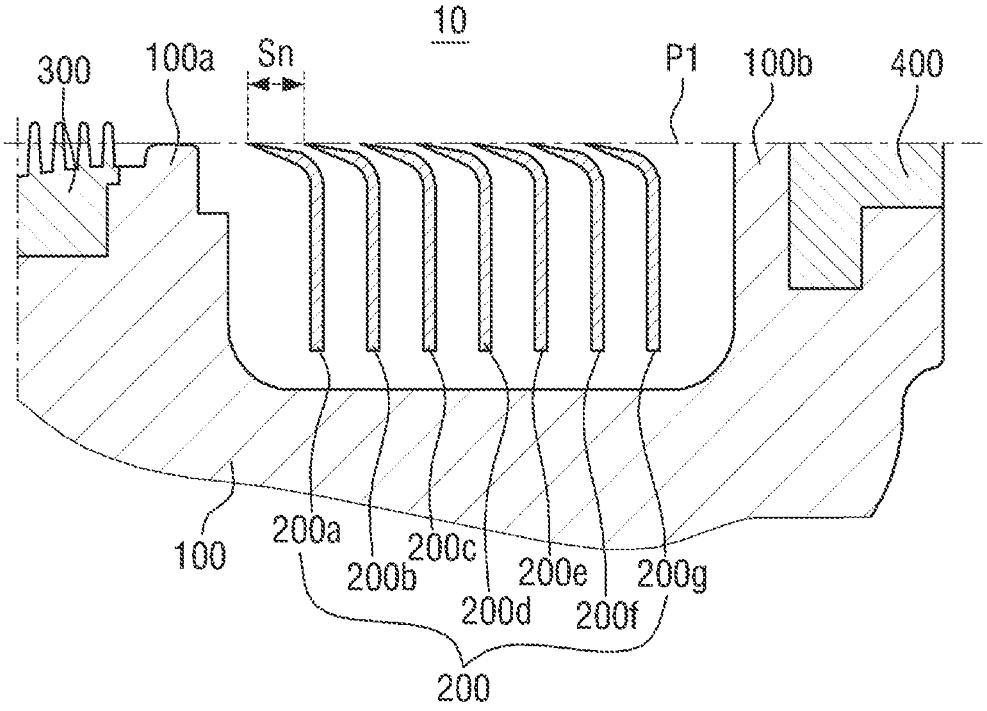
FIG. 2 is a cross-sectional side view of a razor cartridge on which razor blades are mounted according to an embodiment of the present invention.

FIG. 1 is a perspective view of a razor cartridge on which razor blades are mounted according to an embodiment of the present invention. FIG. 2 is a cross-sectional side view of a razor cartridge on which razor blades are mounted according to an embodiment of the present invention.

Referring to FIGS. 1 and 2, a razor cartridge 10 according to an embodiment of the present invention is detachably and pivotably mounted on a handle (not shown) of a razor by a connector 600. However, it is not limited thereto, and the razor cartridge 10 may be mounted detachably, but not pivotably. Thus, the razor cartridge 10 may be detached from the handle and replaced with a new razor cartridge according to the user's needs. The razor cartridge 10 includes a housing 100 and razor blades 200. Further, the razor cartridge 10 may further include a rubber strip 300, a lubricating band 400, clips 500, and the connector 600.

The housing 100 forms an outer shape of the razor cartridge 10, and forms an internal space in which the razor blades 200 are installed. Further, the housing 100 may include mounting grooves into which ends of the razor blades 200 in a width direction (Z-axis direction in FIG. 3) are inserted. Since the mounting grooves receive the razor blades 200 with a certain frictional force, the movement of the mounted razor blades can be prevented to some extent. The mounting grooves are formed to correspond to the number of the razor blades 200. For example, if seven razor blades 200 are mounted on the housing 100, seven mounting grooves may be provided.

However, in some embodiments, the mounting grooves may be omitted. In this case, the razor blades 200 may be fixed and/or installed on the housing by using wire wrapping, cold forming, hot staking insert molding, an adhesive or the like. However, it is not limited thereto, and other assembly methods known to those skilled in the art may be used.

The housing 100 includes a guard 100*a* disposed in front of a foremost razor blade 200*a* and a cap 100*b* disposed behind a rearmost razor blade 200*g* among a plurality of razor blades 200. In this case, a forward direction refers to a shaving direction, and a backward direction refers to a direction opposite to the shaving direction.

The guard 100*a* and the cap 100*b* are formed in one-piece with the housing, or may be configured separately and combined. Further, the guard 100*a* and the cap 100*b* may be formed of the same material as the housing 100, or a material different from the housing 100. However, since an imaginary plane P1 connecting the guard 100*a* and the cap 100*b* defines an imaginary shaving plane P1 during shaving, it is preferable that the guard 100*a* and the cap 100*b* are formed of a hard material such as plastic having hardness above a certain level.

A rubber strip 300 which is located in front of the guard 100*a* is formed of a flexible material having an elastic force to pull the skin and align the hair during shaving. That is, the rubber strip 300 serves to increase the shaving efficiency by erecting in advance the hair on the skin in contact with the rubber strip 300 during shaving. Accordingly, the razor blades to be subsequently in contact with the hair are able to easily cut the hair of the skin.

The rubber strip 300 includes a plurality of fins. Since the plurality of fins are formed of a flexible material, the fins are pressed to the imaginary shaving plane P1 during shaving. The rubber strip 300 may be formed of an elastic material. For example, the rubber strip 300 may be formed of a rubber material, a silicone material, or the like. The rubber strip 300 may be formed of a more flexible material than the housing 100, and coupled to the front of the housing 100.

A lubricating band 400 may be coupled to the rear of the cap 100*b* in the housing. The lubricating band 400 enables smooth shaving by providing a lubricating material to the skin during shaving. Further, the lubricating band 400 may include a shaving aid, a shaving aid composite and so on for delivering the lubricating material to the user's skin and the like. The lubricating band 400 tends to have higher lubricity at high humidity than at low humidity.

On the other hand, the rubber strip 300 and the lubricating band 400 may be coupled to the housing 100 or may be formed in one-piece with the housing 100. For example, the rubber strip 300 may be injection molded as part of the housing 100, but it is not limited thereto. The rubber strip 300 may be manufactured by co-injection molding or insert molding in the housing 100.

Further, the clips 500 are components for preventing the razor blades 200 from being detached from the housing 100, and may be coupled to at least one of both ends of the razor blades 200 in the width direction (Z-axis direction). The clips 500 are bent at the lower surface of the housing 100 through openings at the both ends in order to fix the plurality of razor blades 200 on the housing 100 in a wrapping form in a forward and backward direction.

The razor blades 200 are components which are installed in the internal space of the housing 100 to cut the hair extending from the user's skin. The razor blades 200 may be coupled to the housing 100 by allowing both ends of the razor blades 200 in the width direction to be inserted into the mounting grooves. Further, both ends of the razor blades 200 in the width direction may be coupled to the clips 500. Accordingly, the razor blades 200 are prevented from being separated from the housing 100 by the clips 500, so that the razor blades 200 can be safely mounted in the housing 100.

A plurality of razor blades 200 are provided, and the plurality of razor blades 200 are positioned between the rubber strip 300 and the lubricating band 400. For example, seven razor blades 200*a* to 200*g* may be installed on the housing 100. With the development of the razor technology, the number of the razor blades 200 tends to increase. Currently, a razor cartridge having 4 to 6 blades is mainly used, but a razor cartridge having 7 blades as shown in FIG. 2 or more blades will be used generally in future. However, assuming that the size of the razor cartridge, particularly, the size in the forward and backward direction is limited to some extent, an increase in the number of razor blades inevitably causes various problems due to a reduction in span between the razor blades. Thus, it is required to design the razor blades and the razor cartridge in consideration of these problems.

In FIG. 2, the imaginary shaving plane P1 formed during shaving means a tangential plane tangent to the front and rear upper surface of the housing 100. During shaving, a force F is applied to the razor blades 200 in a direction substantially perpendicular to the contact plane P1. Further, cutting edges 211 of the razor blades 200 are provided in the razor cartridge 10 so as to form a predetermined angle with the tangential plane P1. Generally, the exposure of the cutting edges 211 is defined as "Positive," "Negative," or "Neutral" depending on whether the cutting edges 211 of the razor blades 200 pass through the contact plane P. The degree of exposure of the cutting edges 211 may act as one of the factors that affect comfortablility, safety and the like during shaving.

Further, a distance Sn between the cutting edges of the razor blades adjacent to each other is generally defined as a span. The span is theorized to affect a shaving process in several ways. Specifically, the span may control the convexity of the skin between the razor blades. For example, a narrow span improves the comfort of the skin by reducing the expansion of the skin, but decreases the washing efficiency of the razor. Furthermore, a wide span improves the washing efficiency of the razor, but may reduce the comfort of the skin by increasing the expansion of the skin. Additionally, the razor blades may be generally formed to have the same span Sn between the razor blades adjacent to each other, but formed to have different spans.

Generally, the razor blades should have sufficient strength to cut the hair. If the strength of the razor blades is not sufficient, displacement is generated in the blades by a force exerted when shaving, which may reduce the shaving performance or cause injury by the razor blades. Accordingly, the razor blades and the razor cartridge according to the present invention are configured to have a geometrical shape and arrangement characteristics in order to not only ensure sufficient rigidity even in thin blades, but also to ensure sufficient shaving performance and rinsability while mounting a plurality of thin blades on a razor cartridge having a limited size.

Figure 3A:
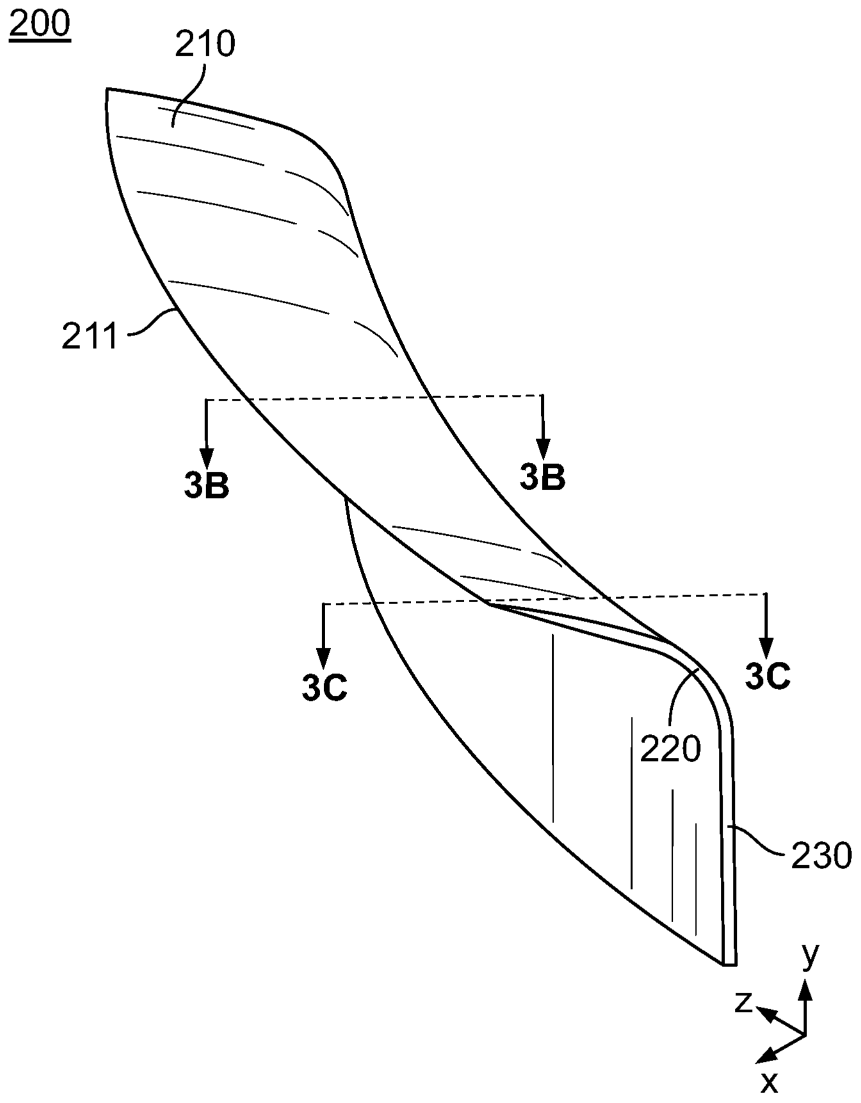
FIG. 3A is a perspective view of a razor blade according to an embodiment of the present invention.
Figure 3B:
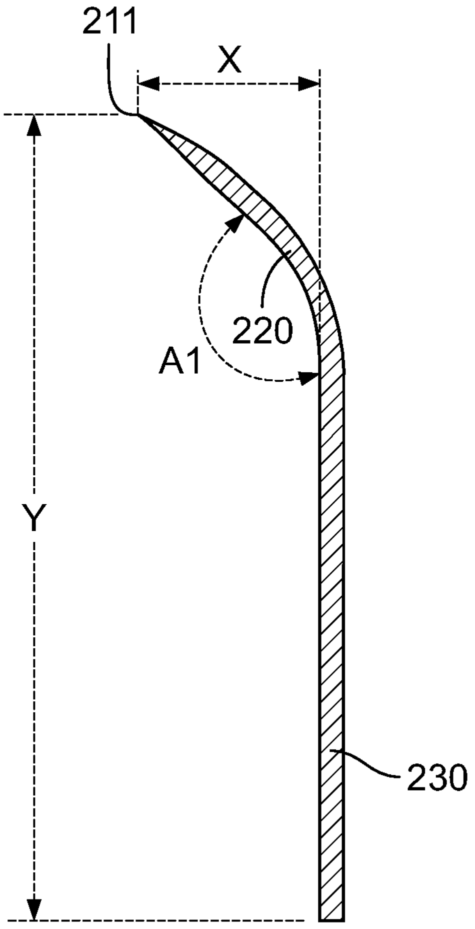
FIG. 3B is a cross-sectional side view of the razor blade of FIG. 3A along line 3B-3B.
Figure 3C:
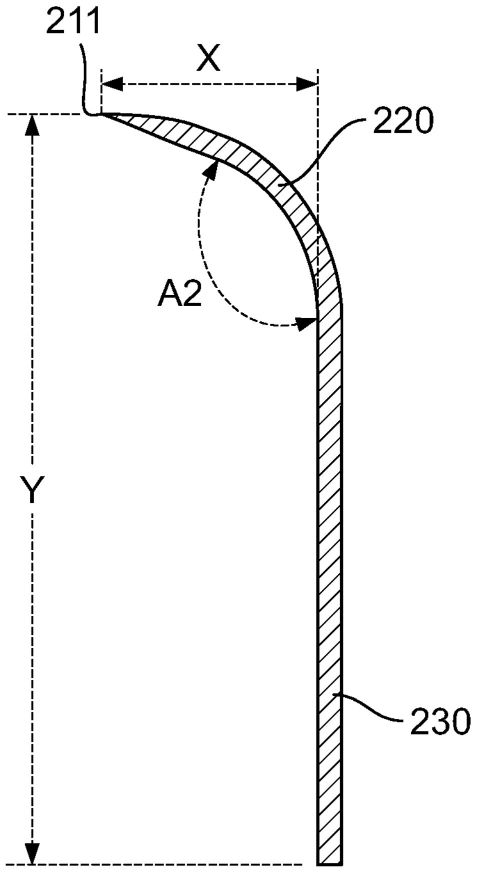
FIG. 3C is a cross-sectional side view of the razor blade of FIG. 3A along line 3C-3C.
Figure 4:
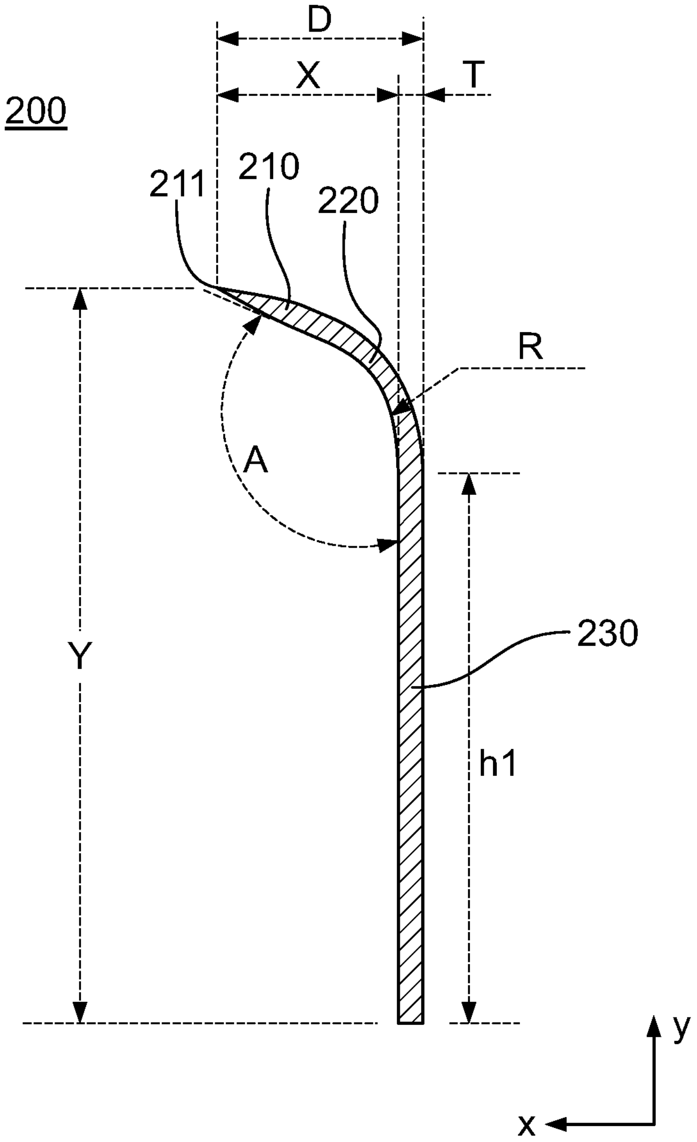
FIG. 4 is a cross-sectional side view of a razor blade according to an embodiment of the present invention.

FIG. 3A is a perspective view of a razor blade according to an embodiment of the present invention. FIG. 3B is a cross-sectional side view of the razor blade of FIG. 3A taken along line 3B-3B, and FIG. 3C is a cross-sectional side view of the razor blade of FIG. 3C taking along line 3C-3C. FIG. 4 is a cross-sectional side view of a razor blade according to an embodiment of the present invention. Referring to FIGS. 3A, 3B, 3C, and 4, first, a razor blade 200 includes a base portion 230, a bent portion 220 extending in a bent manner from one end of the base portion 230, and an edge portion 210 extending from one end of the bent portion 220.

A conventional razor blade is configured such that a blade is mounted on a support, and the support is formed to have a thickness larger than 0.1 mm in order to support the blade. Generally, the conventional razor blade is formed to have thickness larger than 0.1 mm and smaller than 0.2 mm. In a conventional case, since the thickness t of the support is larger than that of the blade, it is difficult to implement a narrow span. However, in the razor blade 200 according to the present invention, since the edge portion 210, the bent portion 220 and the base portion 230 are formed in one-piece, the thickness t can be reduced to 0.1 mm or less. Thus, it is possible to implement a narrow span Sn. However, if the thickness t of the razor blade 200 is smaller than 0.05 mm, the razor blade 200 fails to have sufficient strength, and cannot properly function as a razor blade. Therefore, the thickness t of the razor blade is required to range from 0.05 mm to 0.1 mm in order to implement a narrow span while ensuring a certain level of strength. Particularly, it has been confirmed through experiments that when the thickness t of the razor blade ranges from 0.07 mm to 0.08 mm ($0.07\ mm \leq t \leq 0.08\ mm$), it is possible to implement a narrow span Sn while ensuring sufficient strength of the razor blade.

The edge portion 210 except the cutting edge 211, the bent portion 220 and the base portion 230 may be formed to have the same thickness, or formed such that at least one of them has a different thickness. The razor blade 200 is manufactured by bending a sharpened portion of the blade. In this bending process, contraction occurs on the front surface of the bent portion 220, and expansion occurs on the rear surface of the bent portion 220. In this case, larger deformation occurs on the rear surface than the front surface of the bent portion, and the thickness of the bent portion decreases in order to constantly maintain the volume of the bent portion. Therefore, the thickness of the base portion 230 may be larger than the thickness of the bent portion 220, as shown in FIGS. 3B, 3C, and 4.

One end of the base portion 230 is connected to the bent portion 220, and the base portion 230 serves to support the bent portion 220 and the edge portion 210. Further, the base portion 230 is disposed in a direction parallel to a longitudinal direction (Y-axis direction) of the razor blade. The base portion 230 may be formed to have a thickness of 0.075 mm, and as described above, may be formed to have a thickness slightly larger than that of the bent portion 220.

A height h1 (distance in the longitudinal direction) of the base portion 230 may be range from 1.7 mm to 2.1 mm (1.7 mm≤Y1≤2.1 mm), and is greater than a height (about 1.5 mm) of the support of the conventional razor blade. If the length of the razor blade is constant, the greater the height h1 of the base portion 230, the smaller a first separation distance X, which will be described later.

The bent portion 220 extends in a bent manner from one end of the base portion 230. The bent portion 220 is formed to have an inner curvature radius R which ranges from 0.3 mm to 1.2 mm (0.3 mm≤R≤1.2 mm). In this case, the inner curvature radius R refers to a radius of curvature of the front surface of the bent portion. The larger the inner curvature radius, the smaller the degree of bending.

As one example, the bent portion 220 may be formed to have the inner curvature radius R which ranges from 0.3 mm to 0.45 mm (0.3 mm≤R≤0.45 mm). However, if the inner curvature radius of the bent portion 220 ranges from 0.3 mm to 0.45 mm, cracks are likely to occur during bending work. Accordingly, it is preferable to perform heat treatment on the bent portion 220 in order to prevent the occurrence of cracks.

As another example, the bent portion 220 may be formed to have the inner curvature radius R which satisfies 0.45 mm<R<0.9 mm. In this case, cracks may not occur even though heat treatment is not performed on the bent portion 220 during bending work.

The bent portion 220 extends in a bent manner from one end of the base portion 230 to form an angle A of 90 degrees to 120 degrees. Thus, the edge portion 210 and the base portion 230 are formed with an angle A of 90 degrees to 120 degrees. Since the angle A is related to an angle at which the hair (not shown) and the edge portion 210 meet each other, it is closely related to the shaving performance.

As one example, the bent portion 220 may extend in a bent manner from the base portion 230 to form an angle of 105 degrees to 115 degrees. Accordingly, since an acute angle at which the edge portion 210 and the hair meet each other ranges from 15 degrees to 25 degrees, the hair can be cut effectively. As shown in FIGS. 3B and 3C and as discussed further below, the angle between the bent portion and the base portion may be larger at a middle portion of the razor blade in the width-wise direction (shown by A1 in FIG. 3B) compared to the angle at a side of the razor blade (shown by A2 in FIG. 3C).

The edge portion 210 has one end at which the cutting edge 211 is formed and the other end connected to the bent portion 220. In this case, the cutting edge 211 serves to cut the hair.

The edge portion 210 is formed to make an angle of 90 degrees to 120 degrees with the base portion 230. Accordingly, an acute angle at which the edge portion 210 and the hair meet each other ranges from 0 degree to 30 degrees. Particularly, when an acute angle at which the edge portion 210 and the hair meet each other ranges from 15 degrees to 25 degrees, the shaving performance is excellent. Thus, it is preferable that the angle A between the edge portion 210 and the base portion 230 ranges from 105 degrees to 115 degrees (105°≤A≤115°). However, according to the experimental results for the shaving performance of the razor blade, when the angle A between the edge portion 210 and the base portion 230 was in a range of 106 degrees to 108 degrees (106°≤A≤108°), the razor blade exhibited the most excellent shaving performance. Therefore, it is most preferable that the angle A between the edge portion 210 and the base portion 230 ranges from 106 degrees to 108 degrees (106°≤A≤108°).

The razor blade 200 is configured such that the edge portion 210, the bent portion 220 and the base portion 230 are formed in one-piece. If the razor blade 200 is formed in one-piece, the razor blade 200 can be manufactured thinly while reducing operation processes of the razor blade 200. However, when an unitary razor blade is manufactured thinly, it is required to ensure sufficient rigidity of the razor blade.

Therefore, in order to ensure sufficient rigidity of the razor blade, the razor blade 200 is formed such that the first separation distance X between a straight line extending in the longitudinal direction (Y-axis direction) from the front surface of the base portion 230 and an end point of the cutting edge 211 is shorter than the conventional razor blade. It should be noted that the first separation distance X is defined as a distance to the end of the cutting edge 211 from the base portion 230 when the base portion 230 is erected in a vertical direction. When the razor blade 200 is actually mounted on the razor cartridge, the base portion 230 is not necessarily oriented in the vertical direction. If the base portion 230 of the razor blade 200 is mounted obliquely on the housing 100, a distance of the edge portion 210 and the bent portion 220 in a horizontal direction is different from the first separation distance X of the present invention. In other words, the first separation distance X according to the present invention is determined only based on the geometrical shape of the razor blade 200 itself without considering a state in which the razor blade is mounted on the razor cartridge. Thus, the first separation distance X is defined on the assumption that the base portion 230 is oriented in the vertical direction in order that the base portion 230 does not affect the rest of the razor blade 200 acting as a cantilever. That is, in this case, since the base portion 230 is oriented in the vertical direction, i.e., a direction perpendicular to the tangential plane P, the base portion 230 is subjected to only a compressive force from the skin in contact with the razor cartridge, and a cantilever effect of the base portion 230 is not exhibited.

In this way, by making the first separation distance X shorter, the resistance of the cutting edge against the force F exerted on the razor blade during shaving, i.e., the strength of the cutting edge, is improved. This is attributed to the reason that, when considering a portion of the razor blade extending from the edge portion 210 to the bent portion 220 as a cantilever, deformation of the cantilever is reduced by reducing only the length while the thickness or the size of its cross-section is constant.

Thus, the razor blade 200 is formed such that the first separation distance X between a straight line extending in the longitudinal direction (Y-axis direction) from the front surface of the base portion 230 and an end point of the cutting edge 211 ranges from 0.3 mm to 1.0 mm. If the first separation distance X is less than 0.3 mm, it is difficult to ensure a minimum size of the edge portion 210 due to a basic size of the bent portion 220 formed when bending. If the first separation distance X is greater than 1.0 mm, it may be difficult to ensure sufficient rigidity in the thin razor blade.

As a result of experiments on the washing efficiency of the razor at every 0.05 mm interval within the above-described range of the first separation distance X, it was confirmed that when the first separation distance X was 0.3 mm to 0.85 mm, even though a plurality of razor blades are installed in the cartridge having a limited size, a minimum span can be ensured, and the washing efficiency and the shaving performance of the razor were maintained over appropriate levels. However, when the first separation distance X was 0.3 mm to 0.75 mm, the washing efficiency and the shaving performance were more excellent than those in other numerical ranges. Particularly, when the first separation distance X was about 0.7 mm, the washing efficiency and the shaving performance were optimum.

Figure 5A:
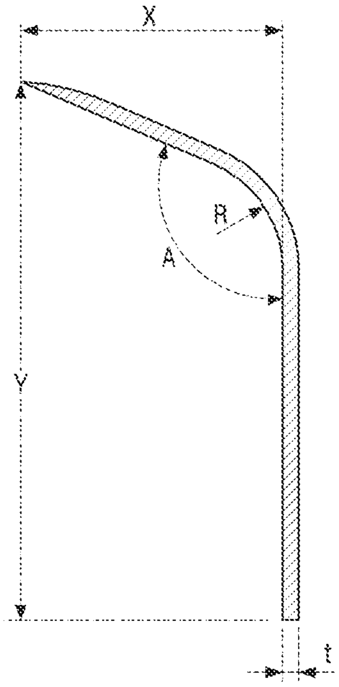
FIG. 5A is a cross-sectional side view of a conventional razor blade.
Figure 5B:
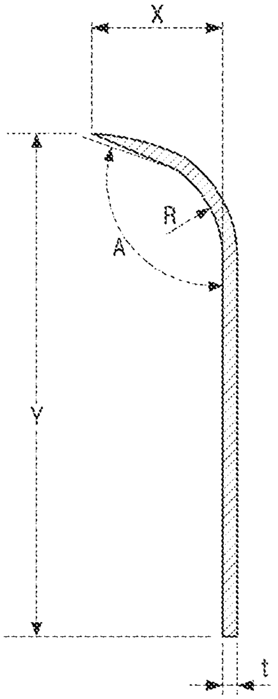
FIG. 5B is a cross-sectional side view of a razor blade according to an embodiment of the present invention.

With regard to the first separation distance, the conventional razor blade and the razor blade of the present invention are compared with reference to FIGS. 5A, 5B and Table 1. FIG. 5A illustrates the conventional razor blade, and FIG. 5B illustrates the razor blade according to the embodiment of the present invention. Table 1 represents some geometrical characteristics of the conventional razor blade and the razor blade of the present invention.

Referring to FIGS. 5A, 5B and Table 1, it can be seen that the conventional razor blade having the long first separation distance X is formed such that the first separation distance X exceeds 1.0 mm, and the razor blade of the present invention having the short first separation distance X is formed such that the first separation distance X is 0.37 mm to 0.86 mm, approximately, 0.3 mm to 1.0 mm. Specifically, the first separation distance X of the conventional razor blade falls within a range from 1.15 mm to 1.54 mm, which exceeds 1.0 mm.

TABLE 1

| | X | Y |
|---|---|---|
| Sample 1 of the conventional razor blade | 1.27 mm | 2.45 mm |
| Sample 2 of the conventional razor blade | 1.15 mm | 1.83 mm |
| Sample 3 of the conventional razor blade | 1.54 mm | 3.10 mm |
| Sample 1 of the razor blade of the present invention | 0.37 mm | 2.22 mm |
| Sample 2 of the razor blade of the present invention | 0.61 mm | 2.40 mm |
| Sample 3 of the razor blade of the present invention | 0.86 mm | 2.51 mm |

In order to confirm that the strength of the razor blade is improved when the first separation distance X of the razor blade 200 is short, a test was conducted in which a predetermined external force was applied to the conventional razor blade illustrated in FIG. 5A and the razor blade of the present invention illustrated in FIG. 5B. In the razor blades illustrated in FIGS. 5A and 5B, the same thickness t, the same curvature radius R, the same angle A and the same second separation distance (height) Y were maintained, and only the first separation distance X was set to different values. In this test, the first separation distance X of FIG. 5A was 1.2 mm, and the first separation distance X of FIG. 5B was 0.7 mm.

As a result, it was confirmed that deformation of about −0.0081 mm in the longitudinal direction (Y-axis direction) and about +0.0065 mm in the forward and backward direction (X-axis direction) occurred in the conventional razor blade, whereas deformation of about −0.0041 mm in the longitudinal direction (Y-axis direction) and about +0.0039 mm in the forward and backward direction (X-axis direction) occurred in the razor blade of the present invention. It is apparent from the results of the test that the strength of the razor blade is improved when the first separation distance is short.

Further, if the first separation distance X is short, since the razor blades 200 installed on the housing 100 can be maintained with a relatively narrow span Sn, it is possible to increase the number of the razor blades 200.

Generally, as the number of the razor blades 200 installed on the housing 100 increases, the shaving performance is improved. However, since the size of the internal space of the housing 100 in which the razor blades 200 are installed is limited, as the number of the razor blades 200 increases, the span of the razor blades 200 adjacent to each other becomes narrow, and the comfort of the skin during shaving is improved, but the washing efficiency of the razor decreases. Thus, conventionally, three to five razor blades are generally installed on the housing.

Figure 6A:
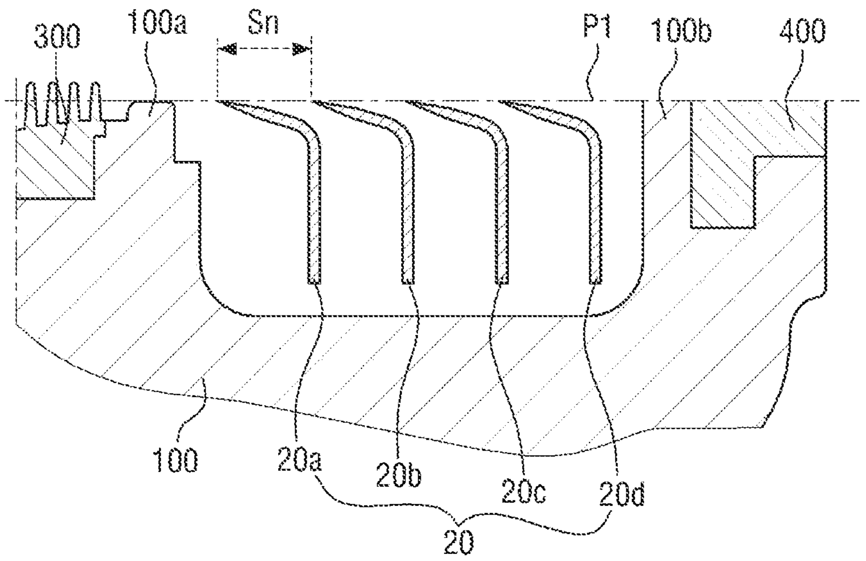
FIG. 6A is a cross-sectional side view of a conventional razor cartridge.
Figure 6B:
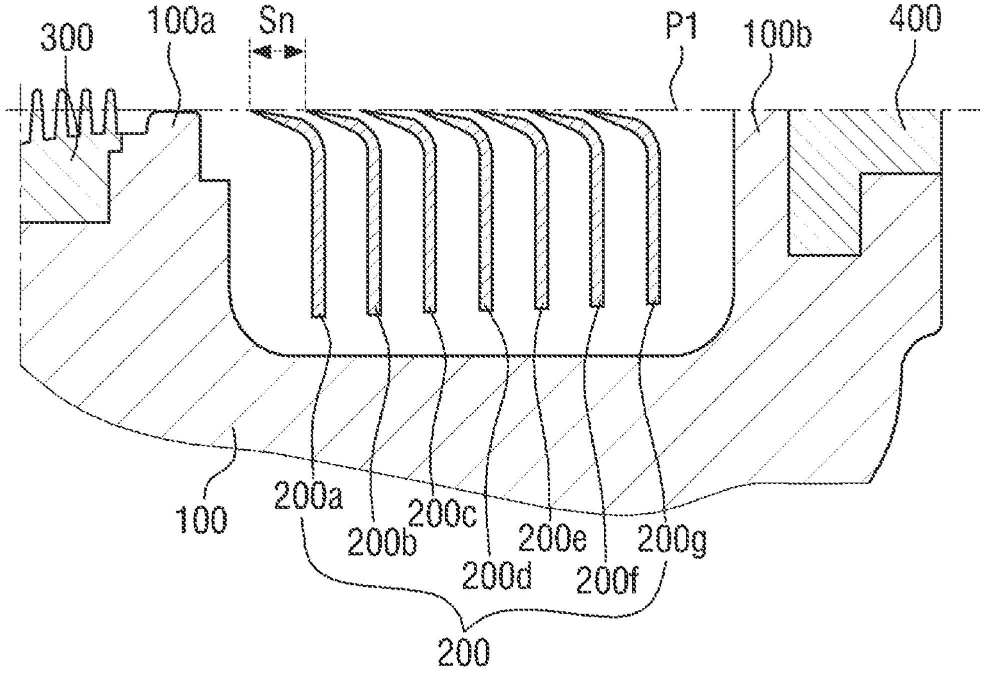
FIG. 6B is a cross-sectional side view of a razor cartridge according to an embodiment of the present invention.

However, if the first separation distance X is short, a larger number of razor blades 200 can be installed on the housing 100 than a conventional case while a narrow span is appropriately formed between the adjacent razor blades 200. Referring to FIGS. 6A and 6B, the span Sn of the razor blades 200*a* to 200*g* installed on the razor cartridge (FIG. 6B) according to the embodiment of the present invention is narrower than the span Sn of conventional razor blades 20*a* to 20*d* installed on a conventional razor cartridge (FIG. 6A). Accordingly, four razor blades 20*a* to 20*d* are provided in the conventional razor cartridge, but up to seven razor blades 200*a* to 200*g* may be provided in the razor cartridge 10 in which the razor blades 200 of the present invention are installed.

In addition, a tunnel u is formed between the razor blades adjacent to each other. As used herein, the term “tunnel” means the shortest distance u from the rear surface of the front blade to the cutting edge of the rear blade. The tunnel may mean a size of an inlet through which water is introduced between the razor blades when washing the razor. Thus, if the tunnel is larger, the washing efficiency of the razor can be improved.

Figure 7A:
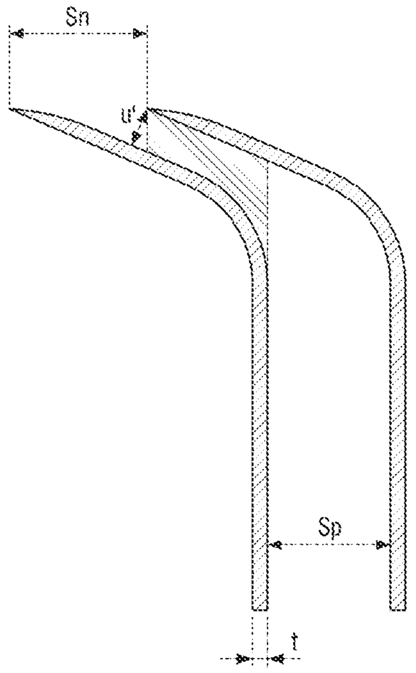
FIG. 7A is a cross-sectional side view of two conventional razor blades.
Figure 7B:
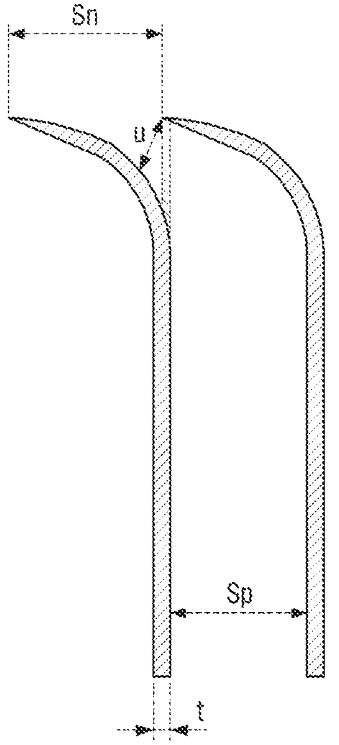
FIG. 7B is a cross-sectional side view of two razor blades according to an embodiment of the present invention.

A relationship between the tunnel u and the first separation distance X will be explained with reference to FIGS. 7A and 7B. FIG. 7A illustrates the conventional razor blades and FIG. 7B illustrates the razor blades according to the embodiment of the present invention. The other geometrical characteristics (span, second separation distance, inner curvature radius, etc.) except the first separation distance X of the razor blades of FIG. 7A are equal to those of the razor blades of FIG. 7B. Thus, if the first separation distance X is long as in the conventional razor blades, a tunnel u' becomes the shortest distance from the rear surface of the edge portion 210 of the front razor blade 200 to the cutting edge 211 of the rear razor blade 200. However, if the first separation distance X is short as in the razor blades according to the embodiment of the present invention, the tunnel u becomes the shortest distance from the rear surface of the bent portion 220 of the front razor blade 200 to the cutting edge 211 of the rear razor blade 200, and is larger than the tunnel formed by the conventional razor blades. That is, the tunnel u of the razor blades having the short first separation distance X is larger than the tunnel u' of the razor blades having the long first separation distance X (u>u'). Accordingly, if the first separation distance X is short, mostly, the large tunnel u can be formed, thereby improving the washing efficiency of the razor.

Further, if the first separation distance X is short as in the razor blades according to the embodiment of the present invention, since an area where the edge portion 210 of the front razor blade 200 overlaps with the edge portion 210 or the bent portion 220 of the rear bent portion 220, i.e., an overlap area (hatched area in FIGS. 7A and 7B) is reduced, the washing efficiency of the razor is improved. That is, as can be seen from FIG. 7A, in the conventional razor blades, since the overlap area (hatched area) is large while the tunnel u' is short, shaving residues are not easily discharged to a space between the base portion 230 of the front razor blade 200 and the base portion 230 of the rear razor blade 200. Further, as can be seen from FIG. 7B, in the razor blades of the present invention, since the overlap area (hatched area) is very small while the tunnel u is relatively long, shaving residues can be easily discharged to a space between the base portion 230 of the front razor blade 200 and the base portion 230 of the rear razor blade 200.

In addition, in the case of using the razor blades 200 according to the present invention, since the first separation distance X is short, when the razor blades 200 are arranged with a specific span value, the overlap area may not be formed. In this case, the rinsability can be further maximized. Moreover, the razor blades are installed on the razor cartridge 10 at a predetermined interval Sp. The predetermined interval Sp means a distance between the base portions 230 of the adjacent razor blades 200 in the forward and backward direction. The interval Sp affects the value of the span Sn. As the interval increases, the value of the span also increases. As the interval decreases, the value of the span also decreases. In other words, the interval and the span have a proportional relationship. Further, according to the design of the razor cartridge 10, the razor blades may be arranged on the cartridge at the same interval or at different intervals.

Further, the first separation distance X of the razor blade may be affected by the angle A between the edge portion 210 and the base portion 230. If the length of the edge portion 210 is the same as the length of the bent portion 220, the first separation distance X becomes shorter as the angle A between the edge portion 210 and the base portion 230 is larger, and the first separation distance X becomes longer as the angle A between the edge portion 210 and the base portion 230 is smaller. A more detailed description will be made with reference to Table 2 below representing the geometrical characteristics of razor blade samples.

As one example, when the length of the edge portion 210 is the same as the length of the bent portion 220, the first separation distance X is 0.65 mm if the angle A is 107.3 degrees, and the first separation distance X is 0.68 mm if the angle A is 106.4 degrees. Accordingly, it can be seen that the first separation distance X becomes shorter as the angle A is larger.

TABLE 2

| | A | X |
|---|---|---|
| Sample 1 of the razor blade of the present invention | 106.4 degrees | 0.68 mm |
| Sample 2 of the razor blade of the present invention | 107.3 degrees | 0.65 mm |

Further, the first separation distance X of the razor blade 200 may be smaller than approximately twice the inner curvature radius R of the bent portion 220. That is, the first separation distance X satisfies "X<2R." If the first separation distance X satisfies "X<2R," the first separation distance X is generally short. Accordingly, the strength of the cutting edge 211 against the force exerted when shaving is improved, and it is possible to improve the shaving performance and implement a narrow span.

From a technical standpoint, if the first separation distance X is less than the inner curvature radius R of the bent portion, it is difficult to ensure a minimum size of the edge portion 210 due to a basic size of the bent portion 220. If the first separation distance X is greater than twice the inner curvature radius R, it may be difficult to ensure sufficient rigidity in thin razor blades.

Hereinafter, a relationship between the first separation distance and the inner curvature radius will be explained by comparing the conventional razor blade and the razor blade of the present invention. Table 3 represents some geometrical characteristics of the conventional razor blade and the razor blade of the present invention.

Referring to Table 3 below, it can be seen that the conventional razor blade having the long first separation distance X is formed such that the first separation distance X is greater than twice the inner curvature radius R, and the razor blade of the present invention having the short first separation distance X is formed such that the first separation distance X is smaller than twice the inner curvature radius R. Accordingly, it can be seen that when the first separation distance X is smaller than twice the inner curvature radius R, the first separation distance X is generally short.

TABLE 3

| | X | R |
|---|---|---|
| Sample 1 of the conventional razor blade | 1.27 mm | 0.6 mm |
| Sample 2 of the conventional razor blade | 1.15 mm | 0.35 mm |
| Sample 3 of the conventional razor blade | 1.54 mm | 0.72 mm |
| Sample 1 of the razor blade of the present invention | 0.37 mm | 0.37 mm |
| Sample 2 of the razor blade of the present invention | 0.61 mm | 0.51 mm |
| Sample 3 of the razor blade of the present invention | 0.86 mm | 0.51 mm |

Meanwhile, in addition to the first separation distance X, in the present invention, a separation distance (height) between a straight line extending in the forward and backward direction from the other end of the base portion 230 and an end point of the cutting edge 211 is defined as a second separation distance Y. The second separation distance Y may be approximately 2.3 mm to 2.7 mm (2.3 mm≤Y≤2.7 mm).

As described above, it is possible to describe the conditions of maintaining sufficient rigidity of thin razor blades using only the first separation distance X. However, additional consideration may be needed with regard to the whole rigidity of the edge portion 210, the bent portion 220 and the base portion 230 formed in one-piece. Accordingly, in the present invention, in consideration of the second separation distance Y in addition to the first separation distance X, a parameter is introduced based on their ratio X/Y. That is, if the first separation distance X and the second separation distance Y increase or decrease proportionally, i.e., if geometrical proportion is satisfied, the separation distance ratio X/Y is constant. In this case, the separation distance ratio X/Y means a ratio of the first separation distance X to the second separation distance Y between a straight line extending in the forward and backward direction from the other end of the base portion 230 and an end point of the cutting edge 211. That is, the separation distance ratio X/Y means a value obtained by dividing the first separation distance X by the second separation distance Y.

The separation distance ratio X/Y of the razor blade 200 may satisfy 0.15≤X/Y≤0.4. Particularly, the separation distance ratio X/Y is preferably about 0.3. If the separation distance ratio X/Y is smaller than a lower limit of 0.15, since the first separation distance X is excessively small with respect to the second separation distance Y, it is difficult to perform a basic function of the cutting edge 211 of the edge portion 210. Further, if the separation distance ratio X/Y is greater than an upper limit of 0.4, it is difficult to obtain sufficient rigidity in thin razor blades.

If the value obtained by dividing the first separation distance X by the second separation distance Y of the razor blade 200 falls within the above range, when the angle A between the edge portion 210 and the base portion 230 ranges from 90 degrees to 120 degrees, the razor blade may be formed to have the first separation distance X, which is sufficiently short, in view of proportional geometry.

The ratio of the first separation distance X to the second separation distance Y will be explained by comparing the conventional razor blade and the razor blade of the present invention. Table 4 represents some geometrical characteristics of the conventional razor blade and the razor blade of the present invention.

Referring to Table 4 below, the conventional razor blade having the long first separation distance X is formed such that the ratio X/Y of the first separation distance X to the second separation distance Y is greater than 0.4, and the razor blade of the present invention having the short first separation distance X is formed such that the ratio X/Y of the first separation distance X to the second separation distance Y is between 0.15 and 0.4. Accordingly, it can be seen that when the ratio X/Y of the first separation distance X to the second separation distance Y is between 0.15 and 0.4, the first separation distance X is generally short.

TABLE 4

| | X | Y | X/Y |
|---|---|---|---|
| Sample 1 of the conventional razor blade | 1.27 mm | 2.45 mm | 0.518 |
| Sample 2 of the conventional razor blade | 1.15 mm | 1.83 mm | 0.628 |
| Sample 3 of the conventional razor blade | 1.54 mm | 3.10 mm | 0.496 |
| Sample 1 of the razor blade of the present invention | 0.37 mm | 2.22 mm | 0.167 |
| Sample 2 of the razor blade of the present invention | 0.61 mm | 2.40 mm | 0.254 |
| Sample 3 of the razor blade of the present invention | 0.86 mm | 2.51 mm | 0.342 |

If an angle between the base portion 230 and a straight line connecting the cutting edge 211 and the other end of the base portion 230 is a (not shown), the ratio (separation distance ratio) of the first separation distance X to the second separation distance Y of the razor blade is may be substituted by tan a. Accordingly, the strength of the razor blade 200 increases as a is smaller, and the strength of the razor blade 200 decreases as a is greater. Thus, a may be used as a parameter for measuring the strength of the razor blade.

Further, as described above, it is possible to describe the conditions of maintaining sufficient rigidity of the cutting edge 211 using only the first separation distance X, but the thickness t of the razor blade also greatly affects on the strength of the razor blade. That is, when considering a portion of the razor blade extending from the edge portion 210 to the bent portion 220 as a cantilever, even though its length is constant, deformation of the cantilever caused by an external force decreases as the thickness increases, and deformation of the cantilever caused by an external force increases as the thickness decreases. Accordingly, in the present invention, in consideration of the thickness t of the razor blade in addition to the first separation distance X, a parameter is introduced based on their ratio X/t. That is, if the first separation distance X and the thickness t of the razor blade increase or decrease proportionally, i.e., if geometrical proportion is satisfied, the ratio X/t is constant.

In one embodiment of the present invention, the thickness t of the razor blade ranges from 0.05 mm to 0.1 mm. In this case, the thickness t of the razor blade means an average of the thickness of the edge portion 210 except the cutting edge 211, the thickness of the bent portion 220 and the thickness of the base portion 230. Particularly, it is preferable that the thickness t of the razor blade ranges from 0.07 mm to 0.08 mm.

Accordingly, the razor blade 200 is formed such that the ratio of the first separation distance X to the thickness t of the razor blade is 4 to 10 ($4 \le X/t \le 10$). That is, a value obtained by dividing the first separation distance X by the thickness t of the razor blade may range from 4 to 10. Particularly, the razor blade 200 is preferably formed such that the ratio of the first separation distance X to the thickness t of the razor blade is 9 to 9.5 ($9 \le X/t \le 9.5$).

If the ratio X/t is smaller than a lower limit of 4, since the average thickness t of the razor blade is excessively large with respect to the first separation distance X, it is difficult to perform a basic function of the cutting edge of the edge portion 210. Further, if the ratio X/t is greater than an upper limit of 10, since the first separation distance X is excessively large or the average thickness t of the razor blade is excessively small, it is difficult to obtain sufficient rigidity in razor blades.

The ratio of the first separation distance to the thickness of the razor blade will be explained by comparing the conventional razor blade and the razor blade of the present invention. Table 5 represents some geometrical characteristics of the conventional razor blade and the razor blade of the present invention.

Referring to Table 5 below, the conventional razor blade having the long first separation distance X is formed such that the ratio X/t of the first separation distance X to the thickness t of the razor blade is greater than 10, and the razor blade of the present invention having the short first separation distance X is formed such that the ratio X/t of the first separation distance X to the thickness t of the razor blade is between 4 and 10. Accordingly, it can be seen that when the ratio X/t of the first separation distance X to the thickness t of the razor blade is between 4 and 10, the first separation distance X is generally short.

TABLE 5

| | X | t | X/t |
|---|---|---|---|
| Sample 1 of the conventional razor blade | 1.2 mm | 0.075 mm | 16 |
| Sample 1 of the conventional razor blade | 1.54 mm | 0.15 mm | 10.27 |
| Sample 1 of the razor blade of the present invention | 0.7 mm | 0.075 mm | 9.33 |
| Sample 1 of the razor blade of the present invention | 0.37 mm | 0.075 mm | 4.93 |

Further, a dimension D of the razor blade in the forward and backward direction means a separation distance between a straight line extending in the longitudinal direction from the rear surface of the base portion and an end point of the cutting edge 211. That is, the dimension D of the razor blade in the forward and backward direction means the sum of the first separation distance X and the thickness t of the razor blade, preferably, the thickness of the base portion 230.

The dimension D of the razor blade in the forward and backward direction ranges from 0.35 mm to 1.2 mm (0.35 mm≤D≤1.2 mm). Particularly, it is preferable that the dimension D of the razor blade in the X-axis direction ranges from 0.75 mm to 0.8 mm (0.75 mm≤D≤0.8 mm). As described above, if the ratio X/t have a certain value of a, the dimension D of the razor blade in the forward and backward direction is represented by an equation: D=X+t=X+(X/a)=(1+a)*X/a, and the dimension D of the razor blade in the forward and backward direction is proportional to the first separation distance X.

Further, the razor blade 200 according to the embodiment of the present invention is formed such that a middle portion in the width direction (Z-axis direction) of the razor blade 200 protrudes from both sides. That is, the razor blade 200 is formed to have a convex arcuate structure in a shaving direction. Thus, the cutting edge 211 is also formed such that a middle portion in the width direction of the razor blade 200 protrudes from both sides in the shaving direction.

Further, since the razor blade 200 is formed to have a convex arcuate structure in the shaving direction, the bent portion 220 may be also formed such that the thickness of the bent portion 220 at a middle portion in the width direction (Z-axis direction) of the razor blade 200 is smaller than that at both sides. And the inner curvature radius R may be formed such that a middle portion in the width direction (Z-axis direction) of the razor blade 200 is larger than that at both sides. In addition, the edge portion 210 and the base portion 230 may be formed such that an angle between the edge portion 210 and the base portion 230 at a middle portion in the width direction (Z-axis direction) of the razor blade is larger than that at both sides.

Table 6 shows that when the razor blade 200 is formed to have a convex arcuate structure in the shaving direction, the inner curvature radius R of the bent portion 220 varies in the width direction (Z-axis direction) of the razor blade. Thus, it can be seen that when the razor blade is formed to have a convex arcuate structure in the shaving direction, the bent portion 220 is formed such that the inner curvature radius R of the bent portion 220 at a middle portion in the width direction of the razor blade, which is defined at a cross-section bisecting the razor blade with respect to a width of the razor blade, is larger than the inner curvature radius R of the bent portion 220 at both ends of the razor blade.

An example of this is shown in FIGS. 3B and 3C, where FIG. 3B shows a cross-sectional view of the razor blade of FIG. 3A at the middle portion in the width direction of the razor blade (indicated by line 3B-3B in FIG. 3A) and where FIG. 3C shows a cross-sectional view at a side of the razor blade (indicated by line 3C-3C in FIG. 3A). As shown in FIGS. 3B and 3C, the inner curvature radius of the bent portion may be larger at the middle portion than at the sides, resulting in a larger angle A1 as compared to angle A2.

TABLE 6

| | R of the bent portion at a middle portion | R of the bent portion at both sides |
|---|---|---|
| Sample 1 of the razor blade of the present invention | 0.57 mm | 0.53 mm |
| Sample 1 of the razor blade of the present invention | 0.61 mm | 0.54 mm |

TABLE 6-continued

| | R of the bent portion at a middle portion | R of the bent portion at both sides |
|---|---|---|
| Sample 1 of the razor blade of the present invention | 0.92 mm | 0.81 mm |

Since the razor blade 200 is formed to have a convex arcuate structure in the shaving direction, a force F applied to the cutting edge 211 of the razor blade 200 during shaving may be distributed in the width direction of the razor blade. Accordingly, even if the thickness of the razor blade 220 is smaller, it is possible to maintain the strength of the razor blade 200, thereby preventing the razor blade 200 from being deformed easily. Further, by appropriately adjusting the protruding amount of the razor blade 200, it is possible to improve the user's comfort and/or the cutting performance of the razor blade.

Although the invention has been shown and described with respect to preferred embodiments, the invention is not limited to the specific embodiments. For example, the number of the razor blades 200 installed on the housing 100 is not particularly limited by the embodiments, the number of the razor blades 200 installed on the housing 100 may change within a range of 3 to 10. Further, it will be understood by those skilled in the art that various changes and modification may be made without departing from the scope of the invention as defined in the following claims.

What is claimed is:

1. A razor blade configured to cut hair while moving in a shaving direction, the razor blade comprising:

a base portion;

a bent portion extending in a curved manner from one end of the base portion in the shaving direction, the bent portion comprising:

a first side;

a second side opposing the first side in a width direction of the razor blade which is a direction perpendicular to the shaving direction, and an intermediate portion disposed at a center of the first side and the second side of the razor blade and convexly protruding from the first side and the second side in the shaving direction; and an edge portion extending from one end of the bent portion and comprising a convexly curved cutting edge, wherein a thickness (t) of the razor blade ranges from 0.05 mm to 0.1 mm, wherein a first separation distance (X) between a curved plane coinciding with a front surface of the base portion and a corresponding point along the convexly curved cutting edge ranges from 0.3 mm to 1.0 mm, wherein the first separation distance (X) is less than twice a corresponding inner curvature radius (R) of the bent portion, and wherein the bent portion has a first inner curvature radius in the intermediate portion at the front surface of the razor blade, wherein the bent portion has a second inner curvature radius in the first side or the second side at the front surface of the razor blade, and wherein the first inner curvature radius is larger than the second inner curvature radius.

2. The razor blade of claim 1, wherein the thickness (t) of the razor blade ranges from 0.07 mm to 0.08 mm.

3. The razor blade of claim 1, wherein the first separation distance (X) ranges from 0.37 mm to 0.86 mm.

4. The razor blade of claim 1, wherein the base portion has a height (h1) in a range of 1.7 mm to 2.1 mm.

5. The razor blade of claim 1, wherein a total height of the razor blade represented by a second separation distance (Y) between a plane orthogonal to the base portion and a tip of the edge portion is in a range of 2.3 mm to 2.7 mm.

6. The razor blade of claim 5, wherein a ratio (X/Y) of the first separation distance (X) to the second separation distance (Y) is in a range of 0.15 to 0.4.

7. The razor blade of claim 6, wherein an angle between the edge portion and the base portion is in a range of 105 degrees to 115 degrees.

8. The razor blade of claim 1, wherein the second inner curvature radius is in a range of 0.3 mm to 1.2 mm.

9. The razor blade of claim 1, wherein the second inner curvature radius is in a range of 0.45 mm to 0.9 mm.

10. The razor blade of claim 1, wherein an angle between the edge portion and the base portion ranges from 90 degrees to 120 degrees.

11. A razor blade configured to cut hair while moving in a shaving direction, the razor blade comprising:

- a base portion;
- a bent portion extending in a curved manner from one end of the base portion in the shaving direction, the bent portion comprising:
  - a first side;
  - a second side opposing the first side in a direction of a width of the razor blade which is a direction perpendicular to the shaving direction, and
  - an intermediate portion disposed between the first side and the second side and convexly protruding from the first side and the second side in the shaving direction; and
- an edge portion extending from one end of the bent portion and comprising a convexly curved cutting edge,
- wherein a thickness (t) of the razor blade ranges from 0.05 mm to 0.1 mm,
- wherein a first separation distance (X) between a curved plane coinciding with a front surface of the base portion and a corresponding point along the convexly curved cutting edge ranges from 0.3 mm to 1.0 mm,
- wherein the first separation distance (X) is less than twice a corresponding inner curvature radius (R) of the bent portion, and
- wherein in a first sectional view taken by a first plane that is perpendicular to the direction of the width of the razor blade at the first side of the bent portion, wherein the base portion and the first side of the bent portion are configured to form a first angle at the front surface of the razor blade, and wherein in a second sectional view taken by a second plane that is perpendicular to the direction of the width of the razor blade at the intermediate portion of the bent portion, the base portion and the intermediate portion of the bent portion are configured to form a second angle at the front surface of the razor blade, the second angle being greater than the first angle.

12. The razor blade of claim 11, wherein in a third sectional view taken by a third plane that is perpendicular to the direction of the width of the razor blade at the second side of the bent portion, wherein the base portion and the second side of the bent portion are configured to form a third angle at the front surface of the razor blade, and wherein the third angle is less than the second angle.

13. A razor blade configured to cut hair while moving in a shaving direction, the razor blade comprising:

- a base portion;
- a bent portion extending in a curved manner from one end of the base portion in the shaving direction, the bent portion comprising:
  - a first side;
  - a second side opposing the first side in a direction of a width of the razor blade which is a direction perpendicular to the shaving direction, and
  - an intermediate portion disposed between the first side and the second side and convexly protruding from the first side and the second side in the shaving direction; and
- an edge portion extending from one end of the bent portion and comprising a convexly curved cutting edge,
- wherein the bent portion has a first inner curvature radius in the intermediate portion at a front surface of the razor blade,
- wherein the bent portion has a second inner curvature radius in the first side or the second side at the front surface of the razor blade, and wherein the first inner curvature radius is larger than the second inner curvature radius, and wherein in a first sectional view taken by a first plane that is perpendicular to the direction of the width of the razor blade at the first side of the bent portion, wherein the base portion and the first side of the bent portion are configured to form a first angle at the front surface of the razor blade, and wherein in a second sectional view taken by a second plane that is perpendicular to the direction of the width of the razor blade at the intermediate portion of the bent portion, the base portion and the intermediate portion of the bent portion are configured to form a second angle at the front surface of the razor blade, the second angle being greater than the first angle.

14. The razor blade of claim 13, wherein a thickness (t) of the razor blade ranges from 0.05 mm to 0.1 mm,

- wherein a first separation distance (X) between a curved plane coinciding with a front surface of the base portion and a corresponding point along the convexly curved cutting edge ranges from 0.3 mm to 1.0 mm, and
- wherein the first separation distance (X) is less than twice a corresponding inner curvature radius (R) of the bent portion.

* * * * *